United States Patent [19]

DeVogel et al.

[11] Patent Number: 4,936,377
[45] Date of Patent: Jun. 26, 1990

[54] FOOD STORAGE CART WITH THERMO WALL

[75] Inventors: Nicolaas DeVogel; Frederick J. Gorges, both of Bellevue, Wash.

[73] Assignee: The Boeing Company, Seattle, Wash.

[21] Appl. No.: 212,923

[22] Filed: Jun. 29, 1988

Related U.S. Application Data

[62] Division of Ser. No. 940,298, Dec. 11, 1986, Pat. No. 4,781,243.

[51] Int. Cl.$^5$ .............................................. F28D 21/00
[52] U.S. Cl. ................................ 165/47; 62/457.2; 62/371; 126/400; 165/902; 165/919
[58] Field of Search ..................... 165/902, 47, 919; 62/457.1–457.9, 371; 126/400

[56] References Cited

U.S. PATENT DOCUMENTS

| | | |
|---|---|---|
| 486,841 | 11/1892 | Trussell . |
| 1,728,364 | 9/1929 | Rivard . |
| 1,950,053 | 3/1934 | Rubin ................................ 62/94 |
| 2,393,245 | 1/1946 | Hadsell ............................. 62/457 |
| 2,504,911 | 4/1950 | Whitecar ........................... 62/95 |
| 2,506,448 | 5/1950 | Gregor . |
| 2,543,524 | 2/1951 | De Oliveira ..................... 219/19 |
| 2,570,250 | 10/1951 | Kleist ........................ 62/DIG. 7 |
| 2,694,297 | 11/1954 | Shoemaker ....................... 62/438 |
| 2,831,328 | 4/1958 | Kleist ............................... 62/126 |
| 3,042,384 | 7/1962 | Bauman . |
| 3,148,676 | 9/1964 | Truog et al. ................... 126/246 |
| 3,187,518 | 6/1965 | Bair ................................. 62/457 |
| 3,205,033 | 9/1965 | Stentz ............................. 312/236 |
| 3,267,856 | 8/1966 | Lindberg, Jr. ................. 102/92.5 |
| 3,678,703 | 7/1972 | Cornish et al. ............... 62/457.2 |
| 3,785,365 | 1/1974 | Laing et al. .................... 126/400 |
| 3,859,819 | 1/1975 | Kaplan ........................... 62/457.2 |
| 3,906,744 | 9/1975 | Knapp et al. .................... 62/438 |
| 3,952,794 | 4/1976 | Spanoudis ......................... 165/2 |
| 4,026,351 | 5/1977 | Biava ............................... 165/58 |
| 4,065,336 | 12/1977 | Conklin ........................ 62/457.2 |
| 4,304,106 | 12/1981 | Donnelly .......................... 62/457 |
| 4,397,159 | 8/1983 | Dodd ............................... 62/382 |
| 4,441,336 | 4/1984 | Cannon ............................ 62/457 |
| 4,471,834 | 9/1984 | Schlote ........................... 126/400 |
| 4,775,002 | 10/1988 | Iwamoto ........................ 62/457.9 |

FOREIGN PATENT DOCUMENTS

| | | | |
|---|---|---|---|
| 165596 | 12/1985 | European Pat. Off. ............ | 126/400 |
| 2627022 | 12/1977 | Fed. Rep. of Germany ........ | 62/430 |

*Primary Examiner*—Albert W. Davis, Jr.
*Attorney, Agent, or Firm*—Delbert J. Barnard

[57] ABSTRACT

First and second face members (12, 14) are secured to the opposite sides of a honeycomb core (16) to provide a structural wall (10). A phase change material (22) is provided within the cells (20) of the wall (10), so that the wall (10) also has the capability of storing thermal energy. The thermal wall (10) may be constructed in the form of a removable shelf (28) for a container (30). It may be constructed in the form of a fixed wall (60) of a container. Such a thermal wall (10) can be constructed to be in the form of a serving vessel, e.g. a dish (FIGS. 14 and 16), a cup (FIG. 13), or the like.

16 Claims, 3 Drawing Sheets

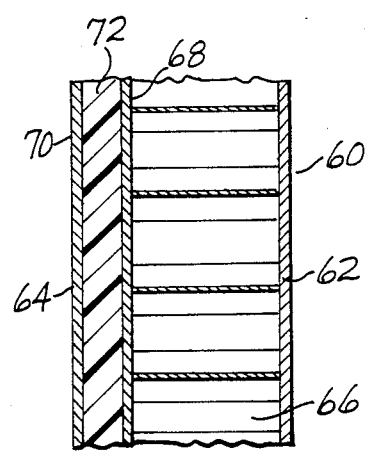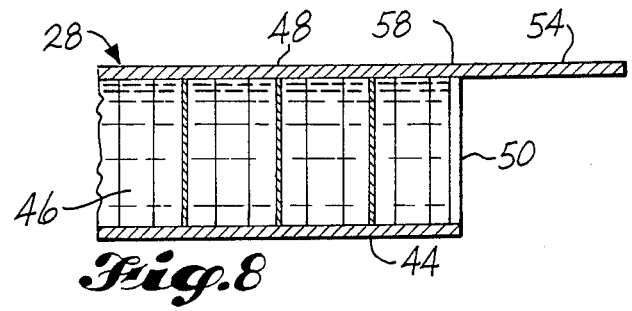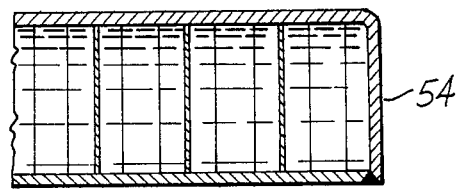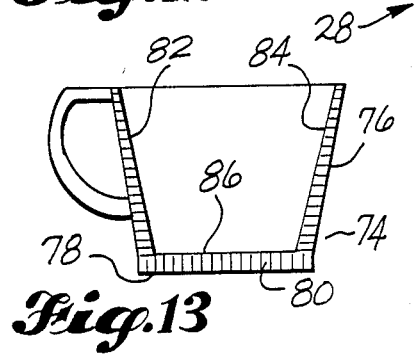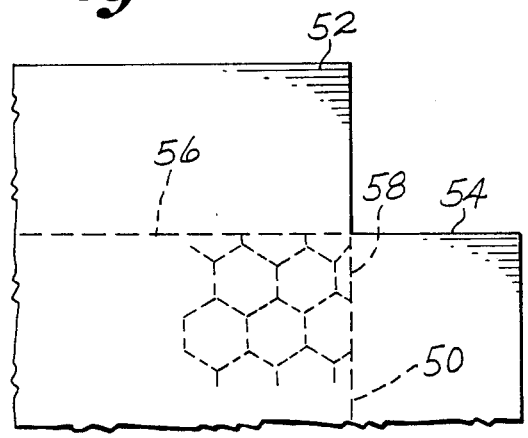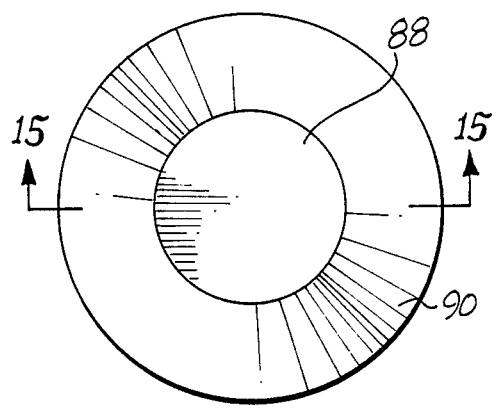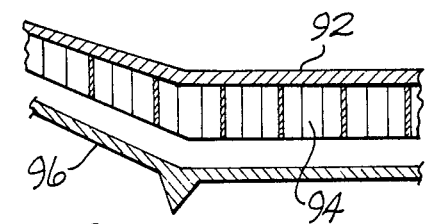

FOOD STORAGE CART WITH THERMO WALL

This application is a division of Ser. No. 940,298 filed Dec. 11, 1986, now U.S. Pat. No. 4,781,243 granted Nov. 1, 1988.

Technical Field

The present invention relates to containers for food or other substances which must be maintained either hot or cold for substantial periods of time while in the containers. More particularly, it relates to the provision of such containers each having at least one wall defined by a honeycomb core and opposite side face members and a material within the cells of the honeycomb which changes physical form to either absorb heat or release heat, and which has a high heat of fusion.

Background Art

The present invention was made while trying to develop a way of keeping food aboard an aircraft either hot or cold without the use of heating or refrigeration equipment aboard the aircraft.

At the present time, food is kept cool aboard an aircraft in one of two ways. One way involves placing the food within food carts and circulating chilled air through the carts. The second way involves storing the food (or beverage) within a cart and placing in the cart bags of dry ice or another refrigerated material.

Presently two methods are utilized for heating food aboard an aircraft. One involves bringing the food aboard the aircraft in a frozen state and then thawing the food out and heating it to a service temperature by the use of ovens aboard the aircraft. The other involves the use of electrically heated carts to either raise frozen food to service temperature or maintain heated food at service temperature.

U.S. Pat. No. 3,205,033, granted Sept. 7, 1965 to Blair E. Stentz and U.S. Pat. No. 3,042,384, granted July 3, 1962, to Henry J. Bauman, each discloses a food cart having two compartments. One of the compartments includes refrigeration apparatus and the other compartment includes an electrical heating element.

U.S. Pat. No. 4,397,159, granted Aug. 9, 1983 to Malcolm J. Dodd, discloses a service cart that is constructed to receive a pan of dry ice on an upper shelf of the cart, and which includes a small blower for circulating air over the coolant and throughout the service cart.

U.S. Pat. No. 4,026,351, granted May 31, 1977, to Bruno Biava, discloses a food transporting container for use by caterers and the like. The container includes removable internal end walls which are constructed to support food containing trays. The endwalls are hollow containers into which hot water is placed if it is desired to maintain the food heated and cold water is placed if it is desired to maintain the food cold.

A similar system but on a smaller scale is disclosed by U.S. Pat. No. 2,504,911, granted Apr. 18, 1950 to Alten E. Whitecar. This patent discloses providing a refrigerant container which is sized to be received within a lunch box, picnic basket, or the like. The refrigerant is frozen by placing the container in a conventional freezer and then the container is placed within the lunch box or the like.

U.S. Pat. No. 2,543,524, granted Feb. 27, 1951, to Gervasio Pinto De Oliveira discloses a food chest which is constructed to include an electric heating unit in its cover or a hollow container insert in which a heated substance is placed if it is desired to keep the food hot, or a cold substance is placed if it is desired to keep the food cold.

U.S. Pat. No. 4,579,170, granted Apr. 1, 1986, to Paul J. Moses and Mark G. Hofius discloses the use of a phase change material within a container for thermal energy storage applications. The primary disclosed use for the container is in solar energy systems.

U.S. Pat. No. 3,304,106, granted Dec. 8, 1981, to William R. Donnelly discloses a food container in the form of a serving vessel having a hollow bottom compartment into which a chemical compound or mixture is placed. Such compound or mixture absorbs and holds heat and is used for keeping food warm for an extended period of time.

A principal object of the present invention is to provide a structural wall for a food container or the like which has superior load carrying characteristics and internal cell spaces into which a phase changing material having a high heat of fusion is encapsulated. This wall may be termed a "thermo wall".

Disclosure of the Invention

In principle, the present invention provides for a food container or food cart for aircraft, which provides storage of food in hot or cold temperatures and thereby no additional heating or cooling apparatus are needed so that a substantial aircraft weight saving is accomplished.

In basic form, a thermo wall constructed in accordance to the present invention comprises a honeycomb core and first and second face members. The face members are connected to the opposite sides of the honeycomb core and close the ends of the core cells. A phase change material is encapsulated within the cells. Such material has a heat of fusion which is substantially higher than the heat of fusion of water.

The thermo wall may be a fixed or removable wall for a container. In use, the wall is heated or refrigerated, for the purpose of heating or cooling the phase change material. If the wall is separate from the rest of the container (e.g. a shelf for a container) it is, following its being heated or refrigerated, placed within the container. Food items, or some other substance to be heated or cooled, are placed within the container. Then the container is closed and used to transport and/or store the food items or other substances.

An advantage of the invention is that the phase change material is incorporated into a wall that is a structural wall of the container. The wall is a honeycomb wall and as such, possesses the known advantages of being both strong and lightweight. By a practice of the invention, the only weight that is added to the container is the weight of the phase change material; additional structure is not required. Also, additional space is not required because the phase change material is put into the honeycomb cells of the wall; it does not occupy any of the storage space in the container.

Another important advantage of the invention is that the placement of the phase change material within the honeycomb cells acts to evenly distribute throughout the wall both the material and the expansion space required for such material. The cell walls prevent the face members from buckling in response to the weight of the phase change material. Regardless of the orientation of the wall, there is not a single body of the phase change material in the lower portion of the wall and a single expansion space in the upper portion of the wall.

A further advantage of the invention is that some cells of the honeycomb wall can be used for receiving fasteners or other hardware and the remaining cells will be intact for the reception of the phase change material. Also, if the wall should be punctured, the only leakage that would occur would be in the cell or cells directly opened by the puncture. The phase change material within the other cells would remain in place undisturbed. Also, the puncture can easily be repaired by introducing a putty-like filler material through the puncture opening. Only a small amount of the filler material will be required and it will not in any way interfere with the phase change material that is within the cells that were unaffected by the puncture.

A further important advantage of the invention is that the phase change material is in contact with the sidewalls of the cells and with the two face members, providing a way of enhancing heat transfer by constructing the cell walls and face members from a material that is a good heat conductor, e.g. aluminum. Further, the direction and extent of thermal energy transfer through the material can be controlled by the choice of material. For example, one face member and the sidewalls of the cells can be constructed from a material that is a good heat conductor and the second face member can be constructed from a material or materials which are good heat insulators.

In accordance with an aspect of the invention, thermo walls are provided in the form of removable shelves for the container.

In accordance with another aspect of the invention, one or more of the fixed walls of the container are thermo walls.

Yet another aspect of the invention is to provide a container with a removable compartment comprising thermo walls.

Still another aspect of the invention is to provide a container that is in the nature of a serving vessel, e.g. a plate, dish, cup, pan, etc., at least a portion of which is a thermo wall.

Other more specific features of the invention are hereinafter described as a part of the description of the best mode of the invention.

Brief Description of the Drawing

In the drawing, like reference numerals are used to designate like parts throughout the several views of the drawing, and:

FIG. 8 is a sectional view taken at a corner of a thermo wall shelf, showing one of the face members extended at the edge of the shelf wall to provide edge material for the shelf;

FIG. 9 is a view like FIG. 8, showing the extension bent downwardly and connected to the lower face member;

FIG. 10 is a plan view of the corner region shown by FIG. 8;

FIG. 12 is a section view like FIG. 2, but of a sidewall of a container, showing the outer face member to be an insulative composite.

FIG. 13 is a sectional view of a cup which includes a thermo wall;

FIG. 14 is a top plan view of a dish;

FIG. 15 is a sectional view taken substantially along line 15—15 of FIG. 14; and FIG. 16 is an enlarged portion of FIG. 15, showing a face member spaced from the core and the second face member, and showing the core formed integral with the second face member.

Best Mode for Carrying Out the Invention

Figure 1:
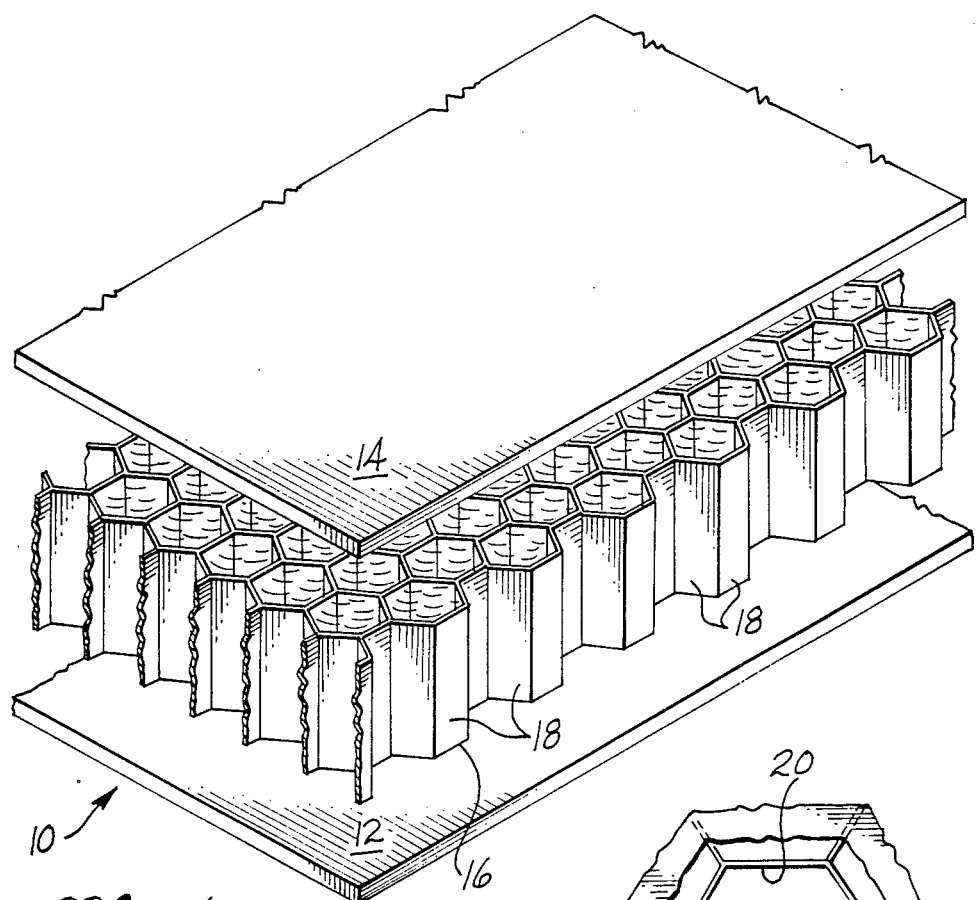
FIG. 1 is an exploded isometric view of a basic thermo wall constructed according to the present invention, such view showing a honeycomb core secured to a first face member, a second face member spaced from the honeycomb core, and a phase change material within the cells of the honeycomb.
Figure 2:
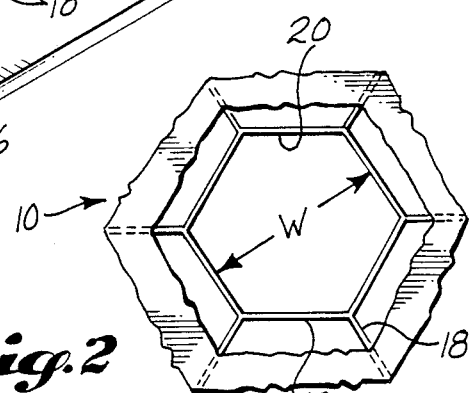
FIG. 2 is a fragmentary view of the thermo wall, on an enlarged scale, looking down into a cell of the honeycomb.
Figure 3:
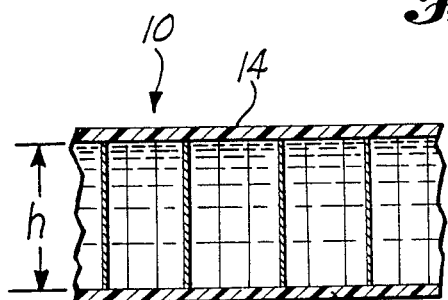
FIG. 3 is a fragmentary sectional view of the honeycomb wall.

Referring to FIGS. 1-3, in basic form, the thermo wall 10 comprises a first face member 12, a second face member 14 and a honeycomb core 16. The face members 12, 14 may be separate members of sheet material which are bonded or otherwise secured to the opposite sides of the core 16. Or, the core could be manufactured integral with face members 12, with face member 14 being a separate member that is bonded to its side of the core 16.

The core 16 comprises thin sidewalls 18 which form a large number of interconnected cells 20, each having a hexagonal shape cross section. The sidewalls 18 of the cells 20 extend perpendicular to the face members 12, 14. The face members 12, 14 form closures for the ends of the cells 20.

Honeycomb panels of this type are per se well-known. They are lightweight and strong and have been used in many installations requiring these properties. Honeycomb panels have been constructed from a wide variety of materials, including metals, plastics and treated paper. The process of manufacturing the core is well-known as are various processes for securing the face members to the opposite sides of the core.

In accordance with the present invention, the honeycomb core 16 is secured to or formed integral with face members 12. Then, prior to bonding the second face member 14 to the open side of the core 16, a phase change material 22 is introduced into the cells 20. A preferred phase change material 22, to be discussed below, exists in the form of a gel when at room temperature.

Some expansion room is necessary so the individual cells 20 are not completely filled with the phase change material 22. The phase change material 22 is introduced into the cells 20 up to a level which allows the necessary expansion space. Then the second face member 14 is bonded to the open side of the core 16. This incapsules the phase change material 22 within the cells 20. It evenly distributes the material 22 throughout the interior of the wall 10 and also evenly distributes the expansion space throughout the wall 10, so that a single large air pocket does not exist in the interior of the wall 10.

The introduction of the phase change material 22 into the cells 20 adds weight to the panel or wall 10, but it is beneficial weight. The fact that the components 12, 14, 18 are lightweight results in the finished thermo wall 10, including the phase change material 22, having a gross weight which is not objectionably large.

If the phase change material 22 were to be introduced into a single large cavity defined between spaced apart side members, such material 22 would tend to buckle one or both of the face members, depending on the orientation of the wall. Also, the expansion space would shift in position as the orientation of the wall is changed. In wall 10, the honeycomb sidewalls 18 firmly interconnect the face members 12, 14, preventing them from buckling outwardly, even if the face members 12, 14 are very thin. The expansion space in the individual cells 20 will change in position in response to a change in the orientation of the wall 10. However, the individual cells 20 evenly distribute both the phase change material 22 and the expansion space and this even distribution is maintained regardless of the orientation of the wall 10.

If in a given installation it is necessary to embed a fastener in a portion of the wall 10, this can be easily done without any injurious effects. The fasteners are installed in a group of the cells without disturbing any of the other cells. The phase change material 22 is not introduced into any of the cells in the region in which a fastener is installed. The installation of the fastener in no way interfere's with the introduction of phase change material in the remaining cells.

In a given installation, if a region of a thermo wall 10 should be punctured, the opening formed by the puncture would open into only one or a small few of the cells 20. The phase change material 22 in the punctured cell or cells 20 may leak out through the opening. However, the material 22 would remain in the other cells. The puncture could be easily repaired by use of a putty-like filler.

Another important advantage of the thermo wall 10 is that the incapsulation of the phase change material within the cells 20 greatly increases the surface area contacted by the phase change material 22. The efficiency of the thermo wall 10 is dependent in part on the rate of heat transfer to or from the phase change material 22. This rate of heat transfer is enhanced by the increase in surface area. The phase change material 22 within each cell 20 is in contact with the sidewalls 18 of the cell 20 in addition to the face members 12, 14.

In some installations it will be desirable to construct both face members 12, 14 and the sidewalls 18 of the cells 20 from a material which is a good heat conductor, e.g. sheet aluminum. In other installations it may be permissible or desirable to construct one of the face members to be a good insulator. There will be some installations in which plastic materials and/or treated paper (e.g. Nomex) can be used.

In FIG. 2 the width dimension of an individual cell 20 is designated "w". In FIG. 3, the cell height, or thickness dimension of the core 16, is designated "h". It has been found that the cell width w should be increased when cell height h is decreased, and vice versa. Structurally speaking, the cells 20 are columns. The column strength is increased by decreasing the cell width w at the same time that the cell height h is increased.

Figure 4:
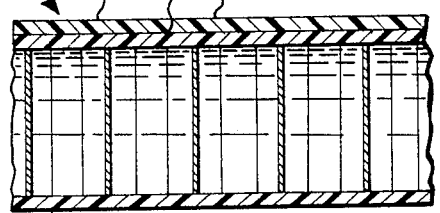
FIG. 4 is a view like FIG. 3, but showing a face member on one side of the core which includes a protective facing of a tough material.
Figure 5:
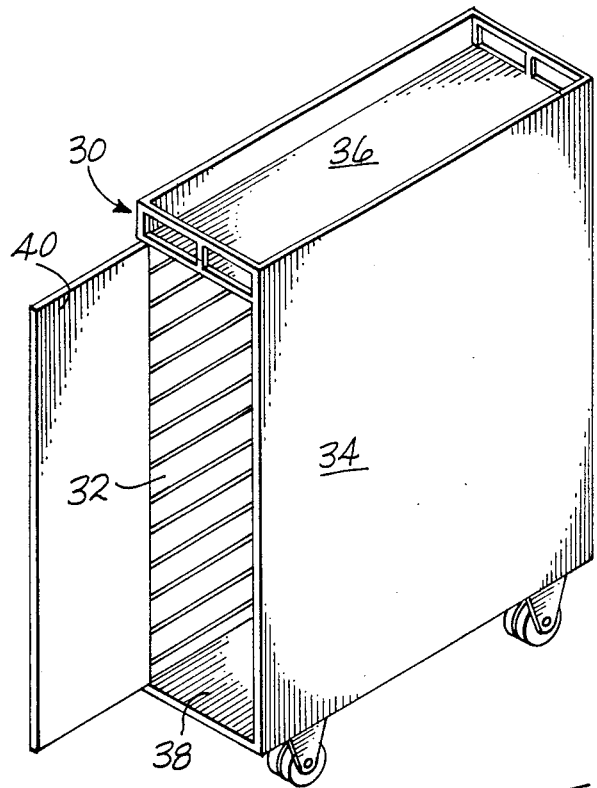
FIG. 5 is an isometric view of a serving cart of the type used aboard aircraft.

Referring to FIG. 4, the face member 14' may itself be a laminated structure. It may comprise an inner sheet 24 that is bonded to the core 16 and an outer sheet 26 of a tougher material that is bonded to the inner sheet 24. For example, inner sheet 24 may be sheet aluminum and outer sheet 26 may be a sheet of a structural plastic which is more resistant than aluminum to scratching and other forms of wear.

Figure 6:
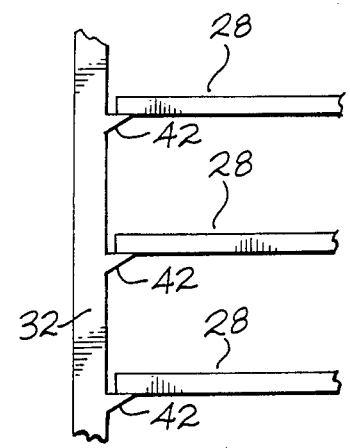
FIG. 6 is an enlarged scale fragmentary view of a sidewall portion of the serving cart, showing the use of thermo walls in the form of removable shelves for the carts.
Figure 7:
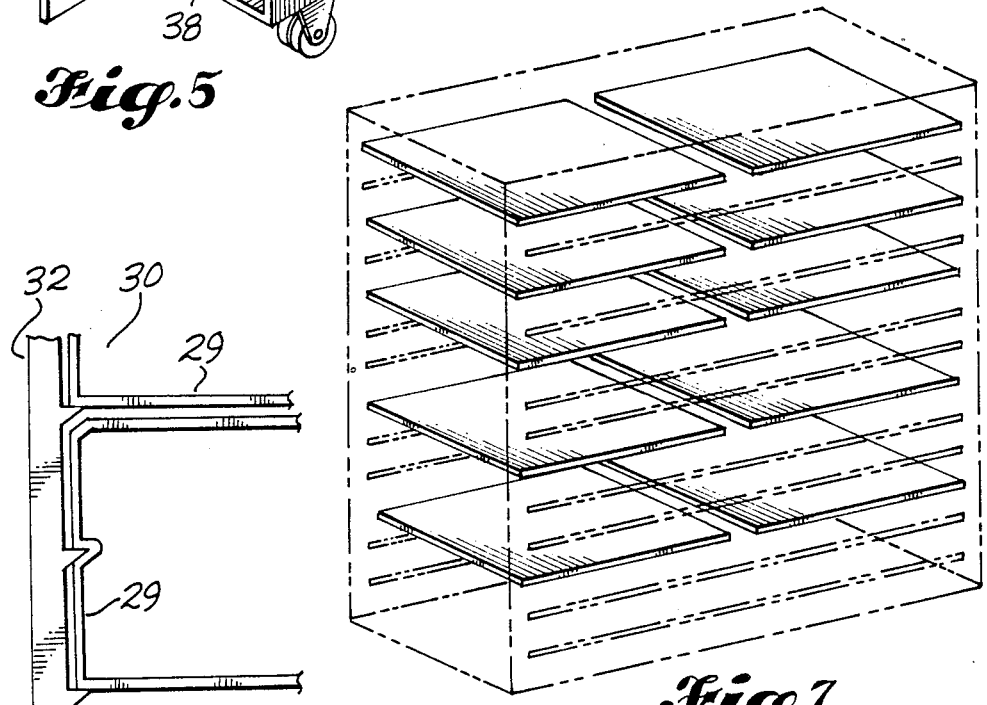
FIG. 7 is an isometric view of a plurality of thermo wall shelves in a spaced relationship that they would occupy in a cart, such view including a phantom line showing of the cart envelope.

FIGS. 5-12 relate to a preferred embodiment of the invention. In this embodiment, the thermo walls are in the nature of removable shelves 28 which fit into a service cart 30 that is used for storing food that is to be served aboard an aircraft. In basic form the service cart 30 comprises sidewalls 32, 34, a top wall 36, a bottom wall 38 and a rear wall (not shown). These walls together define a storage space having an access opening that may be closed by a door 40. The door 40 and each of the walls of the cart 30 may be constructed to be good insulators. The sidewalls 32, 34 are constructed to include laterally inwardly projecting shelf supports or runners 42. As shown by FIGS. 6 and 7, side edge portions of the shelves 28 set down on the supports 42.

As shown by FIGS. 8-10, one face member 44 of the shelf 28 may be cut to be substantially equal in width and length to the honeycomb core 46. The second face member 48 may be cut to extend at its sides and its ends beyond the edge boundaries 50 of the core 46. In FIGS. 8 and 20 the extensions are designated 52, 54. Each extension 52 is of a length equal to the width of the core 46. Each extension 54 is of a length equal to the length of the core 46. The extensions 52, 54 are bent about brake lines 56, 58, to form the ends and sides of the shelf 28. The free edges of the extensions 52, 54 are brazed to the edges of the panel 54. The ends of the extensions 52, 54 are brazed to each other where they meet at the corners of the shelf 28. In other respects, the shelf 28 is a thermo wall constructed like wall 10 described above in connection with FIG. 1-3.

At a ground location, the shelves 28 are either refrigerated to remove heat from the phase change material 22, or are heated to add heat to the phase change material 22. Following their refrigeration or heating the shelves 28 are inserted into the service cart 30, into a position on the supports 42. Then the food is loaded into the cart 30 and the door 40 is closed and locked shut.

The food may be in the form of individual portions within serving containers or may be in bulk form. As used herein, the term "food" includes beverage items, e.g. softdrinks.

Figure 11:
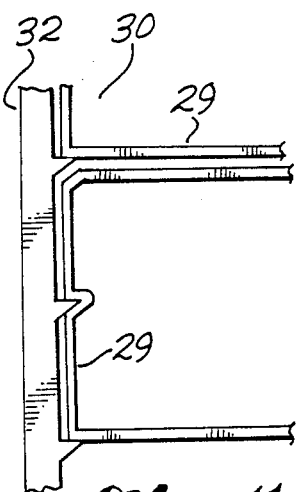
FIG. 11 is a view like FIG. 6, but showing removable compartments for the cart, the walls of which are thermo walls.

The food items are placed on the shelves 28. Two shelves may be provided for each level, with airspaces being provided between the shelves 28 at each level, as shown by FIG. 7. The shelves may be in the form of compartments 29 (FIG. 11).

FIG. 12 shows a construction that the thermo wall may take if it is a fixed wall portion of a container, e.g. a sidewall. This wall, which is designated 60, comprises an inside face member 62, an outside face member 64, and a core 66. Face member 62 and core 66 may be identical to face member 12 and core 16 in FIGS. 1-3. Face member 64 is itself a sandwiched structure. It comprises an inside ply 68, an outside ply 70 and a foam plastic core 72. The inside ply 68 is connected to the outside of the core 68, such as by bonding. The outside ply 64 may be constructed from a tough structural plastic material. In this embodiment, the inside face member 62 and the core 66 may be constructed from materials which are good heat conductors, e.g. aluminum. Outside face member 64 is a good heat insulator.

In accordance with the invention, the thermo wall can be constructed in the form of a serving vessel. Herein the term "serving vessel" is used to mean cups, plates, dishes, pans, bowls, and the like.

FIG. 13 is a vertical sectional view of a cup. In this embodiment the outside face 74 comprises a sidewall 76 and a bottom wall 78. The inside face member 82 comprises a side portion 84 and a bottom portion 86. The core 80 is constructed from thin web walls which extend between the face members 74, 82, and which define with the face members 74, 82 a plurality of cells in the space between the space member 74, 82.

FIGS. 14-16 disclose a serving vessel in the form of a dinner plate. The dinner plate may be constructed to have a flat, circular center portion 88, surrounded by a shallow frusto-conical portion 90. The upper face 92 and the honeycomb core 94 may be formed together. That is, the thin web walls of the core 94 may be formed integral with the face member 92. The face member 96 may be a separate member that is bonded to its side of the core 94. Or, the core 94 may be constructed as a separate member and be bonded to the two face members 92, 96. Or, core 94 can be constructed to be an integral part of face member 96. In such case the face member 92 is a separate member that is bonded to its side of the core 94, following introduction of the phase change material within the cells.

By use of the honeycomb wall construction, it is possible to construct the serving vessels so that they look very much like conventional serving vessels, whether they be cups, plates, pans, etc. The face members can be made from very thin membranes. The cell walls of the core are also very thin membranes constructed to extend at least somewhat perpendicular to the face members. This provides a very strong structure. As in the case of the other walls described above, the phase change material is encapsuled within a space between the face members. The walls of the cells evenly distribute both the phase change material and the expansion space that is necessary and support the face member against buckling. In the case of serving vessels, the face members and the core walls can be constructed from a structural plastic material. In a serving vessel, it is desired to prevent a loss of heat outwardly and downwardly of the vessel. Accordingly, the outer face member is preferably constructed from a material which is a good heat insulator. Fine metal particles can then be incorporated in only the inner face member, or in such face member and its core to make them better heat conductors. If the core is constructed to be separate from the two face members, it can be constructed from an aluminum, so that its walls are good heat conductors. The inner face member could be constructed from structural plastic. Fine metal particles could be added to the structural plastic to make it a better temperature conductor.

Preferably, the phase change material is an eutectic compound. Compounds of this type are presently available on the market. Example brands of this product are sold under the names Cryopac®, Airco®, Wittemann®, and Divajex Blue Ice®. These phase change materials have the ability to absorb or release heat with little or no change in their temperature, while they are in the process of changing from one physical state to another (e.g. liquid to solid, or solid to liquid). Phase change materials are not dependent on a chemical energy reaction. The reaction is a physical absorption or release of energy and is infinitely repeatable, as well as reversible when the transition is from the solid to a liquid state. Typically, the eutectic compounds are non-toxic and non-corrosive.

Other phase change materials are disclosed by the aforementioned U.S. Pat. No. 4,579,170.

Other applications of thermo walls constructed in accordance with the present invention include sidewalls, separator walls, shelves, etc. for the storage compartments of cold storage trucks or transport containers, serving carts used in hospitals or other institutions, food storage compartments used in homes, campers, trailer houses and the like, and solar energy absorbing panels used in solar heating systems. Actually, the thermo wall can be used in any installation in which there is a need to store large amounts of thermal energy.

The scope of the invention is not to be determined by the specific examples which have been illustrated and described. Rather, it is to be determined by the following claims, interpreted in accordance with the established rules of patent claim interpretation, including the use of the doctrine of equivalents.

What is claimed is:

1. A food storage cart on wheels comprising two sidewalls, a top wall, a bottom wall and a rear wall, together defining a storage space having an access opening, and a door for closing said access opening movable between an open position and a closed position, wherein food is received within said storage space, wherein at least one of said walls and door of said cart is a thermo wall of a sandwich construction, comprising an inside face member bounding said storage space, an outside face member, a honeycomb core between the two face members, and means connecting said face members to the opposite sides of the honeycomb core, said honeycomb core including cells having sidewalls extending perpendicular to said face members, said face members closing the ends of said cells, and a phase change material within said cells which has a heat of fusion which is substantially higher than the heat of fusion of water.

2. A food storage cart according to claim 1, wherein the outer face member is a sandwich construction and includes a foam core and an outside face membrane.

3. A food storage cart according to claim 2, wherein the outer face member also includes an inside face membrane which is connected to the honeycomb core.

4. A food storage cart according to claim 1, wherein the thermo wall is a sidewall of the cart.

5. A food storage cart according to claim 2, wherein the outer face member is a sandwich construction and includes a foam core and an outside face membrane.

6. A food storage cart according to claim 5, wherein the outside face member also includes an inside face membrane which is connected to the honeycomb core.

7. A food storage cart according to claim 1, wherein at least the two sidewalls of the cart are thermo walls of the type described.

8. A food storage cart according to claim 7, wherein the outer face member is a sandwich construction and includes a foam core and an outside face membrane.

9. A food storage cart according to claim 8, wherein the outer face member also includes an inside face membrane which is connected to the honeycomb core.

10. A food storage cart according to claim 8, wherein the outside face membrane is a thin structural plastic membrane.

11. A food storage cart according to claim 10, wherein the inside face member is constructed from a good heat conductor.

12. A food storage cart according to claim 11, wherein the honeycomb core is constructed from a material which is a good heat conductor.

13. A food storage cart according to claim 1, wherein the two sidewalls include a plurality of pairs of vertically spaced apart shelf supports, each pair of shelf supports forming sidewall supports for a food supporting shelf.

14. A food storage cart according to claim 13, wherein at least the two sidewalls of the cart are thermo walls of the type described.

15. A food storage cart according to claim 14, wherein the outer face member is a sandwich construction and includes a foam core and an outside face membrane.

16. A food storage cart according to claim 15, wherein the outer face member also includes an inside face membrane which is connected to the honeycomb core.

* * * * *